Oct. 2, 1951     W. C. JONES     2,569,674
LINE-SPACE RELEASE DEVICE FOR TYPEWRITING AND LIKE MACHINES
Filed June 28, 1947
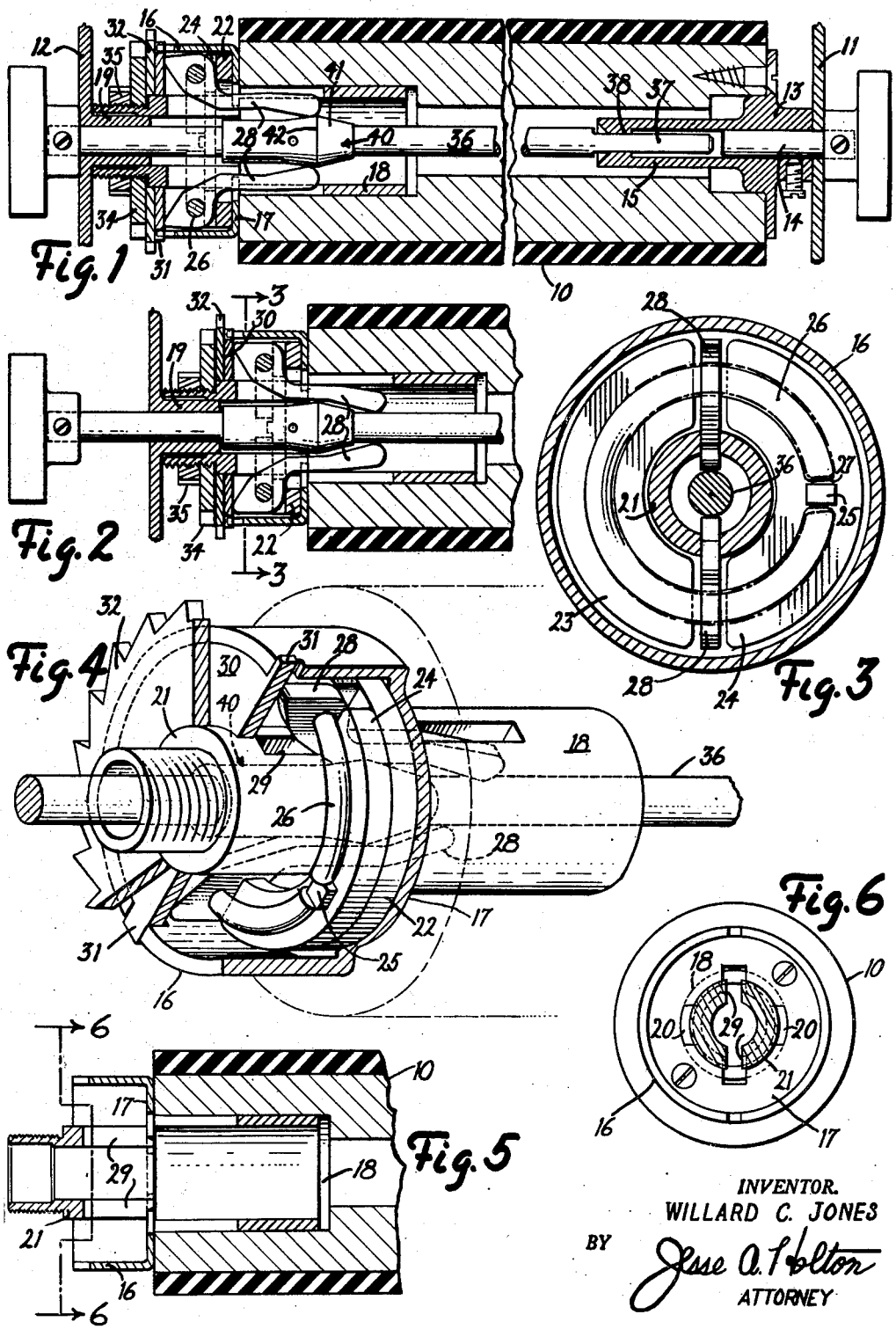
INVENTOR.
WILLARD C. JONES
BY Jesse A. Holton
ATTORNEY Patented Oct. 2, 1951

2,569,674

UNITED STATES PATENT OFFICE 2,569,674

LINE-SPACE RELEASE DEVICE FOR TYPE-WRITING AND LIKE MACHINES

Willard C. Jones, West Hartford, Conn., assignor to Underwood Corporation, New York, N. Y., a corporation of Delaware Application June 28, 1947, Serial No. 757,712

7 Claims. (Cl. 197—123)

1

This invention relates to line-space release devices for typewriters and like machines, by which the typist may release the platen from control of the line-spacing detent means, to allow independent rotation of the platen to fractional or irregular line-space extents.

The invention is in the nature of an improvement over the line-space release device or clutch shown in the Dobson Patent No. 1,931,064 and other devices of generally similar construction wherein the clutch mechanism comprises, say two clutching levers or dogs and cam means coacting with the levers to cause the latter, through the medium of other clutch elements, to clutch the rotatable platen to the ratchet wheel of the line-spacing detent means or to release the platen therefrom. In line-space clutches of this general kind, the clutch levers are preferably of rigid construction to enable more economical manufacture, as compared with clutch levers of resilient spring construction, as heretofore used, to assure a substantially uniform clutching action by both levers. In clutches having substantially rigid levers or dogs fulcrumed on fixed or non-yielding pivots, close tolerances in the manufacture of the clutch parts are required in order to assure a uniform clutching action of the clutch levers.

Accordingly, one of the objects of the invention is to provide an improved line-space clutch mechanism of simple and rugged construction, and affording greater economy in manufacture by enabling more liberal tolerances in the fabrication of the clutch parts.

More specifically, the invention enables the use of rigid or non-yielding clutch levers and nevertheless assures their uniform clutching action, by providing a floating and/or resiliently yieldable pivotal fulcrum for the clutch levers, coacting therewith so as to compensate for minor variations in the clutch parts and assure that a substantially uniform pressure is applied to the clutch engaging elements by the several clutch levers.

Other objects will, in part, be specifically pointed out or become apparent in the following description and accompanying drawings wherein one embodiment which the invention may assume in practice is shown for the purposes of illustration.

In the drawings,

Figure 1 is a longitudinal central sectional view through the typewriter platen and its mounting, embodying the invention, the line-space clutch mechanism being shown in its normal or clutching condition, Figure 2 is a fragmentary sectional view similar to Fig. 1 but showing the clutch mechanism in released condition, Figure 3 is an enlarged transverse sectional view taken on line 3—3 of Fig. 2, omitting the clutch-operating cam element, Figure 4 is an enlarged perspective view of the line-space clutch assembly apart from the platen and its mounting, portions thereof being broken away to facilitate illustration, Figure 5 is a fragmentary longitudinal section of the platen and clutch-mounting and housing members, with certain elements of the clutch mechanism removed, and Figure 6 is an end elevation, partly in section, as viewed on line 6—6 of Fig. 5.

Referring to Fig. 1, the platen 10 is rotatably supported in end members 11 and 12 of the usual typewriter carriage. At the end opposite the clutch mechanism, the platen has a hub 13 secured thereto into which is removably fixed a stub shaft 14 bearing in the end member 11 and having a platen-rotating knob. The hub 13 has integral therewith a portion 15 extending into the bore of the platen.

At its clutch end, the platen has secured thereto, as by screws shown in Fig. 6, a cylinder 16 having an inwardly projecting flange 17. Within the adjacent bore of the platen, Fig. 5, a sleeve 18 is fitted, the latter having tongues 20, Fig. 6, fitting into slots in the flange 17 and secured therein as by swaging over the projecting ends. A threaded sleeve 21 is also rigidly secured by suitable means to the bottom flange of cylinder 16. The elements 16, 18 and 21 are permanently assembled, forming a housing and mounting for the clutch mechanism, and this assembly is rigidly secured to the platen 10, as described. As shown in Fig. 1, the carriage end member 12 has an inwardly projecting trunnion 19 on which the sleeve 21 is journaled to form a bearing for the platen-and-clutch assembly at the clutch end of the platen.

A collar or spacer ring 22 within cylinder 16 bottoms against the flange 17, and against this collar lie two half-annular members 23 and 24, see Figs. 3 and 4, the member 24 including a stud 25. The collar 22 and the two half-annular members serve as a backing support for a fulcrum ring 26. This ring may be open as at 27 to afford adequate resilience without risk of fatiguing and enable installing thereon clutch levers later described.

The ends of ring 26 straddle the stud 25 to prevent the ring from rotating an appreciable degree. This ring is circular in cross-section and is preferably made of spring stock so as to be resiliently yieldable for the purposes hereinafter explained.

Referring to Figs. 5 and 6, the threaded collar 21 has slots 29 at diametrically opposed portions in which clutch levers 28 snugly fit as shown in Fig. 4. The bottom flange 17 of cylinder 16 and the sleeve 18 are correspondingly slotted to provide clearance for the clutch dogs.

A clutch disc 30 fits within the free end of cylinder 16 and has projections 31 disposed within slots of the cylinder to retain disc 30 against rotation relative to cylinder 16 and platen 10 and yet allow movement axially thereof. A ratchet wheel 32 overlies the clutch disc 30 and is rotative on sleeve 21 when the clutch mechanism is released. Ratchet wheel 32 comprises part of the usual line-spacing mechanism of a typewriter, which includes the usual spring-pressed detent or roller, not shown, coacting with the teeth of ratchet 32 to normally define the regular line-space degrees of platen rotation. On the threaded portion of sleeve 21 is a backing plate 34, this plate being threaded on sleeve 21 to afford adjustment of the clutch assembly so as to assure clutching of ratchet wheel 32 to the platen and its release therefrom incident to the operation of the clutch levers 28. Plate 34 is locked in its adjusted position by a lock nut 35 also threaded on sleeve 21. The adjustment of plate 34 on sleeve 21 and the locking thereof by nut 35 are substantially as described and claimed in the Dobson Patent No. 1,931,064.

A shaft 36 projects through a bore in trunnion 19 and extends substantially the length of the platen, having its end 37 non-rotatably keyed in the portion 15 of hub 13, as by providing flats on the shaft to slidably fit a correspondingly shaped aperture 38 in the hub portion 15. The opposite end of shaft 36 carries the usual platen knob by which the platen may be rotated, the torsional force from shaft 36 being applied to the platen through the connection 38 of hub 13.

Operation of the clutch levers 28 to effect clutching or release of the line-space ratchet wheel 32 is effected by an annular cam 40 fixed to shaft 36, as by the pin shown. The periphery of cam 40 is formed substantially, as shown, to provide a tapered cam portion 41 from the high point 42 of which the periphery of cam 40 is oppositely tapered.

Each of the clutch levers 28 is pivoted intermediate its ends on ring 26, the rightward end of each lever coacting with the annular cam 40 and the leftward end being shaped substantially as shown to coact with the clutch disc 30. In the position of the clutch parts shown in Fig. 1, the rightward ends of clutch levers 28 have been forced apart by the coaction therewith of the tapered portion 41 of cam 40, each lever having been rocked about its pivot 26. The leftward end of each clutch lever is thus caused to press clutch disc 30 leftwardly and thereby clutch the ratchet wheel 32 securely between backing plate 34 and disc 30. In the clutched condition cam 40 has its high point 42 just rightward of the ends of the clutch levers so that the shaft 36 is detented in its rightmost position. As shown in Fig. 2, the clutch is released, this being effected by the leftward sliding of shaft 36 to bring the cam 40 free of the clutch levers 28. The leftward end of each clutch lever is thus caused to move so as to release the pressure on clutch disc 30 and thereby free ratchet wheel 32 from the platen, permitting the latter to be rotated independently of the line-space mechanism.

As previously described, the fulcrum ring 26, upon which the clutch levers are pivoted, is made so as to be resiliently yieldable. When the clutch is disengaged, ring 26 is relaxed and takes the form and position shown in full lines in Fig. 3 and, being relaxed, allows the clutch levers to remain loosely in their disengaged positions. However, as the clutch becomes engaged by the rightward movement of cam 40, the resulting spreading action of the clutch-lever ends rocks the levers slightly about their fulcrums and thereby presses the opposite ends thereof with a wedging action against clutch disc 30. This pressing action of the levers on disc 30 first causes the ring 26 to bottom on the half-annular members 23, 24 and, as the clutch-lever ends continue to be expanded, the ring 26 becomes outwardly flexed until, at the point of full engagement of the clutch, this ring is expanded, as shown in dot-and-dash lines in Fig. 3. The thus tensioned ring tends to pull the fulcrum points of each lever 28 toward each other and reacts on the leftward end of each lever so as to impart an appreciable pressure to the clutch disc 30. In effect, the tension of ring 26 in the engaged condition of the clutch determines the extent of pressure imparted to the disc 30 in its clutching action of the ratchet wheel 32, and the strength of ring 26 should therefore be such as to afford a clutching pressure sufficient to overcome the detenting effect of the line-space detent or roller coacting with the ratchet wheel 32.

In respect to the coaction of fulcrum ring 26 with the clutch levers 28 as the latter are cam-operated to cause clutching of the ratchet wheel 32, it should be noted that by supporting the ring against the substantially plane surface provided by members 23, 24, the ring may float or move bodily transversely of the platen axis in such manner as to compensate for inaccuracies or minor variations in the clutch parts, particularly the clutch levers 28 and cam 40. In other words, the ring 26 may move radially of the platen during the clutching action, independently of its capability to yield resiliently as described, and may thus position itself according to the combined reaction thereon of the two clutch levers 28 and cam 40.

It will be understood that the invention is susceptible of modification and change, and may be embodied in various other forms without departing from the spirit of the invention or the scope of the appended claims.

What is claimed is:

1. In a line-space release mechanism for typewriters, a rotatable platen, a line-space ratchet wheel arranged on the platen axis to rotate independently of the platen, means including a clutch device engaging the ratchet wheel, for clutching said wheel to the platen, a plurality of rigid clutch levers coacting with said clutch device to cause the clutching of the ratchet wheel, cam means to operate said clutch levers, a single fulcrum means common to all of said clutch levers, and means on the platen opposing movement of said fulcrum means only in the direction defined by the clutching action of said levers on said clutch device.

2. In a line-space release mechanism for typewriters, a rotatable platen, a line-space ratchet wheel arranged on the platen axis to rotate independently of the platen, means to clutch said ratchet wheel to rotate with the platen, said means including a ratchet-wheel-engageable clutch element shiftable axially of the platen and non-rotative relatively thereto, at least two rigid clutch levers arranged about the platen axis and adapted, when operated, to shift said clutch element into ratchet-wheel engagement, cam means to operate said clutch levers, a single fulcrum element common to all of the clutch levers, and means on the platen supporting said fulcrum element against movement only in the direction defined by the shifting action of said levers on said clutch element.

3. In a line-space release mechanism for typewriters, a rotatable platen, a line-space ratchet wheel mounted on the platen to rotate independently thereof, means to clutch said ratchet wheel to rotate with the platen, said means including a ratchet-wheel-engageable clutch element shiftable axially of the platen and non-rotative relatively thereto, two clutch levers arranged on opposite sides of platen axis and adapted, when operated, to shift said clutch element into ratchet-wheel engagement, cam means to operate said clutch levers, a single fulcrum element common to both of the clutch levers, and a support on the platen for said fulcrum element to oppose movement thereof only in the direction defined by the shifting action of said levers on said clutch element, said fulcrum element being free to move radially of the platen to position itself according to the combined reaction thereon of said clutch levers.

4. In a line-space release mechanism for typewriters, a rotatable platen, a line-space ratchet wheel mounted on the platen to rotate independently thereof, means to clutch said ratchet wheel to rotate with the platen, said means including a ratchet-wheel-engageable clutch element shiftable axially of the platen and non-rotative relatively thereto, two clutch levers at opposite sides of the platen axis and adapted, when operated, to shift said clutch element into ratchet-wheel-clutching engagement, cam means to operate said clutch levers, a resiliently yieldable structure forming a fulcrum for both of the clutch levers, and means on the platen opposing movement of said fulcrum structure only in a direction defined by the clutching action of said levers on said clutch element, said fulcrum structure being therefore free to yield radially of the platen incident to said clutching action.

5. In a line-space release mechanism for typewriters, a rotatable platen, a line-space ratchet wheel mounted on the platen to rotate independently thereof, means to clutch said ratchet wheel to rotate with the platen, said means including a ratchet-wheel-engageable clutch disc shiftable axially of the platen and non-rotative relatively thereto, two clutch levers arranged about the platen axis and adapted, when operated, to shift said clutch disc into ratchet-wheel-clutching engagement, cam means to operate said clutch levers, a resilient ring-shaped member substantially concentric with the platen axis and providing a fulcrum for both of the clutch levers, and a substantially plane surface on the platen, parallel with said clutch disc for backing said resilient fulcrum member in the clutching action of said levers on said disc, the resilience of said fulcrum member allowing it to yield radially incident to said clutching action.

6. In a line-space release mechanism for typewriters, a rotatable platen, a line-space ratchet wheel arranged on the platen axis to rotate independently of the platen, means to clutch said ratchet wheel to rotate with the platen, said means including a plurality of rigid clutch levers, cam means to operate said clutch levers, a single fulcrum means common to all of said clutch levers, and means on the platen opposing movement of said fulcrum means only in the direction defined by the clutching action of said levers.

7. In a line-space release mechanism for typewriters, a rotatable platen, a line-space ratchet wheel arranged on the platen axis to rotate independently of the platen, means to clutch said ratchet wheel to rotate with the platen, said means including a plurality of rigid clutch levers fulcrumed intermediate their ends, cam means to operate said clutch levers, a single fulcrum means common to all of said clutch levers, the action of said cam means on said clutch levers tending to displace the single fulcrum means in directions radially and axially of the platen, and means on the platen opposing displacement of the fulcrum means only in the axial direction.

WILLARD C. JONES.

REFERENCES CITED

The following references are of record in the file of this patent:

UNITED STATES PATENTS

| Number | Name | Date |
|---|---|---|
| 1,148,167 | Helmond | July 27, 1915 |
| 1,656,264 | Bosworth | Jan. 17, 1928 |
| 1,931,064 | Dobson | Oct. 17, 1933 |